US010631198B2

(12) United States Patent
Zhang

(10) Patent No.: US 10,631,198 B2
(45) Date of Patent: Apr. 21, 2020

(54) DATA CONGESTION MANAGEMENT SYSTEM AND METHOD

(71) Applicant: T-Mobile USA, Inc., Bellevue, WA (US)

(72) Inventor: Hongliang Zhang, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 18 days.

(21) Appl. No.: 15/813,070

(22) Filed: Nov. 14, 2017

(65) Prior Publication Data

US 2019/0150026 A1 May 16, 2019

(51) Int. Cl.
H04W 28/02 (2009.01)
H04W 84/04 (2009.01)

(52) U.S. Cl.
CPC ... *H04W 28/0289* (2013.01); *H04W 28/0284* (2013.01); *H04W 28/0226* (2013.01); *H04W 84/042* (2013.01)

(58) Field of Classification Search
None
See application file for complete search history.

(56) References Cited

U.S. PATENT DOCUMENTS

| 2010/0015926 A1* | 1/2010 | Luff | H04L 41/0604 455/67.13 |
| 2012/0140624 A1* | 6/2012 | Denman | H04L 41/0816 370/230.1 |
| 2012/0149387 A1* | 6/2012 | Rawat | H04W 4/02 455/456.1 |
| 2013/0051331 A1* | 2/2013 | Bao | H04W 28/24 370/329 |
| 2014/0146681 A1 | 5/2014 | Gusavec et al. | |
| 2015/0358237 A1 | 12/2015 | Persson et al. | |
| 2016/0044543 A1 | 2/2016 | Nemeth et al. | |
| 2016/0227431 A1 | 8/2016 | Alisawi | |
| 2017/0150365 A1 | 5/2017 | Goswami et al. | |

OTHER PUBLICATIONS

International Searching Authority, International Search Report and Written Opinion, PCT Patent Application PCT/2018/061136, dated Mar. 12, 2019, 16 pages.

* cited by examiner

*Primary Examiner* — Ruihua Zhang
(74) *Attorney, Agent, or Firm* — Perkins Coie LLP

(57) ABSTRACT

Systems and methods are described herein for identifying areas of maximum congestion so that small cells can be deployed at those specific sites to obviate network congestion problems. The systems and methods identify several input sources (e.g., call data records, passively collected data using Mobile app, etc.) that can be used to identify data congestion. The systems and methods divide a particular geographic area into smaller tiles of a certain shape (e.g., hexagon, square, etc.). For each of the geographic tiles, the systems and methods sort and group the input data samples based on their associated congestion discriminating characteristics (e.g., timestamps, type of input data, etc.). The systems and methods then compute a congestion index for each geographic tile area based on the grouped data samples. In this manner, the systems and methods identify geographic tile areas and time periods of high congestion.

19 Claims, 8 Drawing Sheets

DATA CONGESTION MANAGEMENT SYSTEM AND METHOD

BACKGROUND

A telecommunications network is established via a complex arrangement and configuration of many cell sites that are deployed across a geographical area. For example, there may be different types of cell sites (e.g., macro cells, microcells, and so on) positioned in a specific geographical location (e.g., a city, neighborhood, and so on), in order to provide adequate, reliable coverage for mobile devices (e.g., smart phones, tablets, and so on) via different frequency bands and radio networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), 5G mobile communications network, IEEE 802.11 (WiFi), or other communications networks. The devices may seek access to the telecommunications network for various services provided by the network, such as services that facilitate the transmission of data over the network and/or provide content to the devices.

As device usage continues to rise at an impressive rate, there are too many people, using too many network (and/or data)-hungry applications in places where the wireless edge of the telecommunications network has limited or no capacity. As a result, most telecommunications networks have to contend with issues of network congestion. Network congestion in data networking is the reduced quality of service that occurs when a network node is carrying more data than it can handle. Typical effects include queueing delay, packet loss or the blocking of new connections.

Typical congestion control solutions modulate traffic entry into a telecommunications network in order to avoid congestive collapse resulting from oversubscription. This is accomplished by reducing the rate of packets from a sender, which prevents the sender from overwhelming the network. However, such a solution may result in poor user experience and loss competitive edge for mobile service providers. More recently, service providers have been introducing small cell, or heterogeneous networks (HetNets) to combat congestion by increasing network capacity or throughput via utilizing higher wireless spectrum efficiency technologies. HetNets bring in smaller cells, such as femto, pico, or microcells, into a telecommunications network allowing a service provider to mitigate capacity issues by having more cells in total, meaning fewer users per cell or more available network resources per user.

However, one of the most problematic and restrictive network elements service providers face when deploying a small cell network is the backhaul which transports data traffic between cell sites and mobile switch center (MSO). Further, a site acquisition for deploying a small cell can be a painstaking process. Service providers must first determine the owner of the build site and negotiate a plan for installation. Sites are often owned by the city, which may have any number of restrictions on placing devices in its jurisdiction. Moreover, establishing an appropriate backhaul is also costly and time-consuming. For instance, it takes several hundreds of thousands of dollars and several years from start to finish to deploy a small cell network. Thus, it is imperative to identify optimum sites for deploying small cells that will result in the maximum benefit. Such sites generally tend to be locations that experience maximum congestion.

Small cell normally covers a relative small geographical area, say 100 meter×100 meter, or even less. Data congestion may be due to few factors such as heavy-data users, limited bandwidth, hostile radio environment, as well as interference from other cells when traffic volume/number of active users increases. Characterizing and measuring data congestion in such a small area is new and challenging. No direct method or metric is available for identifying or evaluating a site in terms of the maximum congestion.

BRIEF DESCRIPTION OF THE DRAWINGS

Embodiments of the disclosed technology will be described and explained through the use of the accompanying drawings.

DETAILED DESCRIPTION

In light of the above problems, as well as others, the inventors have recognized that it would be beneficial to identify areas of maximum congestion so that small cells can be deployed at those specific sites to obviate congestion problems. Systems and methods are described herein for automatically detecting and identifying areas of congestion in a network. The systems and methods identify several input sources (e.g., call details records, passively collected data using Mobile App, etc.) that can be used to identify data congestion. The systems and methods then divide a particular geographic area into smaller tiles of a certain shape (e.g., hexagon, square, etc.). For each of the geographic tiles, the systems and methods then sort and group the input data samples collected within tile boundary based on their associated congestion discriminating characteristics (e.g., timestamps (e.g., samples divided into 1 hour groups), type of input data sample (e.g., call request, content request), or class of traffic data sample (e.g., streaming, audio, streaming video, web, email, text), or type of content (e.g. dating, maps, social, gaming, music, web browsing), or type of application protocol (e.g., HTTP, DNS, SIP) etc.). The systems and methods then compute a congestion index for each geographic tile area based on the grouped data samples. In this manner, the systems and methods identify geographic tile areas and time periods of high congestion.

Various embodiments of the system will now be described. The following description provides specific details for a thorough understanding and an enabling description of these embodiments. One skilled in the art will understand, however, that the system may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Suitable Computing Environments

Figure 1:
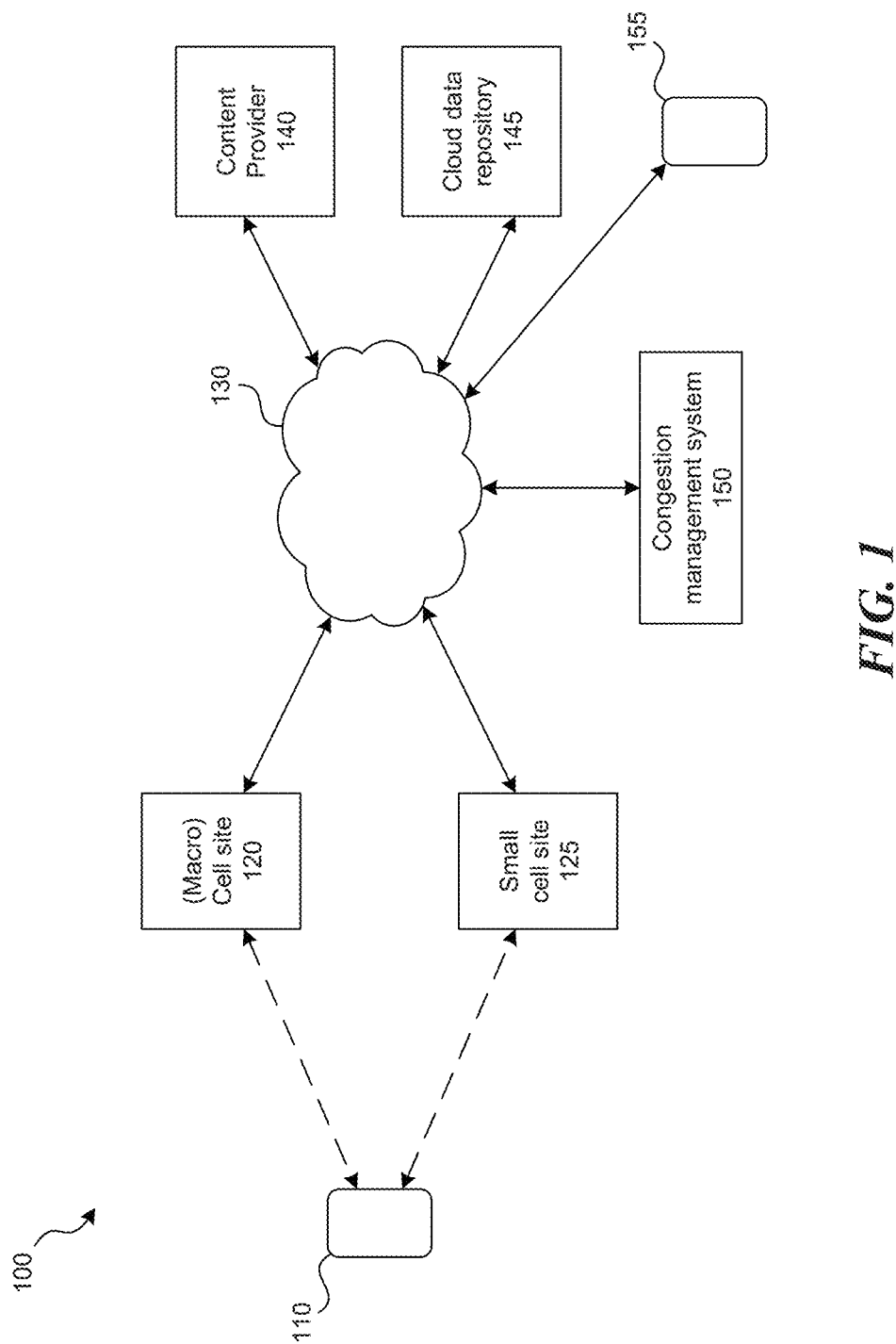
FIG. 1 is a block diagram illustrating a suitable computing environment 100 within which to manage congestion within a telecommunications network.

FIG. 1 is a block diagram illustrating a suitable computing environment 100 within which to detect congestion and identify congestions points within a telecommunications network.

One or more user devices 110, such as mobile devices or user equipment (UE), associated with users (such as mobile phones (e.g., smartphones), tablet computers, laptops, and so on), receive and transmit data, stream content, and/or perform other communications or receive services over a telecommunications network 130, which is accessed by the user device 110 over one or more cell sites 120, 125. For example, the mobile device 110 may access a telecommunication network 130 via a cell site at a geographical location that includes the cell site, in order to transmit and receive data (e.g., stream or upload multimedia content) from various entities, such as a content provider 140, cloud data repository 145, and/or other user devices 155 on the network 130 and via the cell site 120.

The cell sites may include macro cell sites 120, such as base stations, small cell sites 125, such as picocells, microcells, or femtocells, and/or other network access component or sites. The cell cites 120, 125 may store data associated with their operations, including data associated with the number and types of connected users, data associated with the provision and/or utilization of a spectrum, radio band, frequency channel, and so on, provided by the cell sites 120, 125, and so on. The cell sites 120, 125 may monitor their use, such as the provisioning or utilization of physical resource blocks (PRBs) provided by a cell site physical layer in LTE network. For example, a cell site 120 having a channel bandwidth of 5 MHz that provides 25 available physical resource blocks through which data may be transmitted to/from the user device 110.

Other components provided by the telecommunications network 130 may monitor and/or measure the operations and transmission characteristics of the cell sites 120, 125 and other network access components. For example, the telecommunications network 130 may provide a network monitoring system, via a network resource controller (NRC) or network performance and monitoring controller, or other network control component, in order to measure and/or obtain the data associated with the utilization of cell sites 120, 125 when data is transmitted within a telecommunications network.

In some embodiments, the computing environment 100 includes a congestion management system 150 configured to monitor congestion in the network 130 based on, for example, data received from the network monitoring system. The congestion management system 150 may measure congestion at cell sites (e.g., cell sites 120 and 25) and detect when certain cell sites are becoming congested. The congestion management system 150 may then identify the highly congested cell sites as potential locations for deploying additional cell sites (e.g., small cell sites).

FIG. 1 and the discussion herein provide a brief, general description of a suitable computing environment 100 in which the congestion management system 150 can be supported and implemented. Although not required, aspects of the congestion management system 150 are described in the general context of computer-executable instructions, such as routines executed by a general-purpose computer, e.g., mobile device, a server computer, or personal computer. The system can be practiced with other communications, data processing, or computer system configurations, including: Internet appliances, hand-held devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

In some embodiments, the user device 110 and/or the cell sites 120, 125 may include network communication components that enable the devices to communicate with remote servers or other portable electronic devices by transmitting and receiving wireless signals using a licensed, semi-licensed, or unlicensed spectrum over communications network, such as network 130. In some cases, the communication network 130 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. The telecommunications network 130 may also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), 5G mobile communications network, IEEE 802.11 (WiFi), or other communications networks. Thus, the user device is configured to operate and switch among multiple frequency bands for receiving and/or transmitting data.

Further details regarding the operation and implementation of the congestion management system 150 will now be described.

Examples of Managing Congestion in a Telecommunications Network

Figure 2:
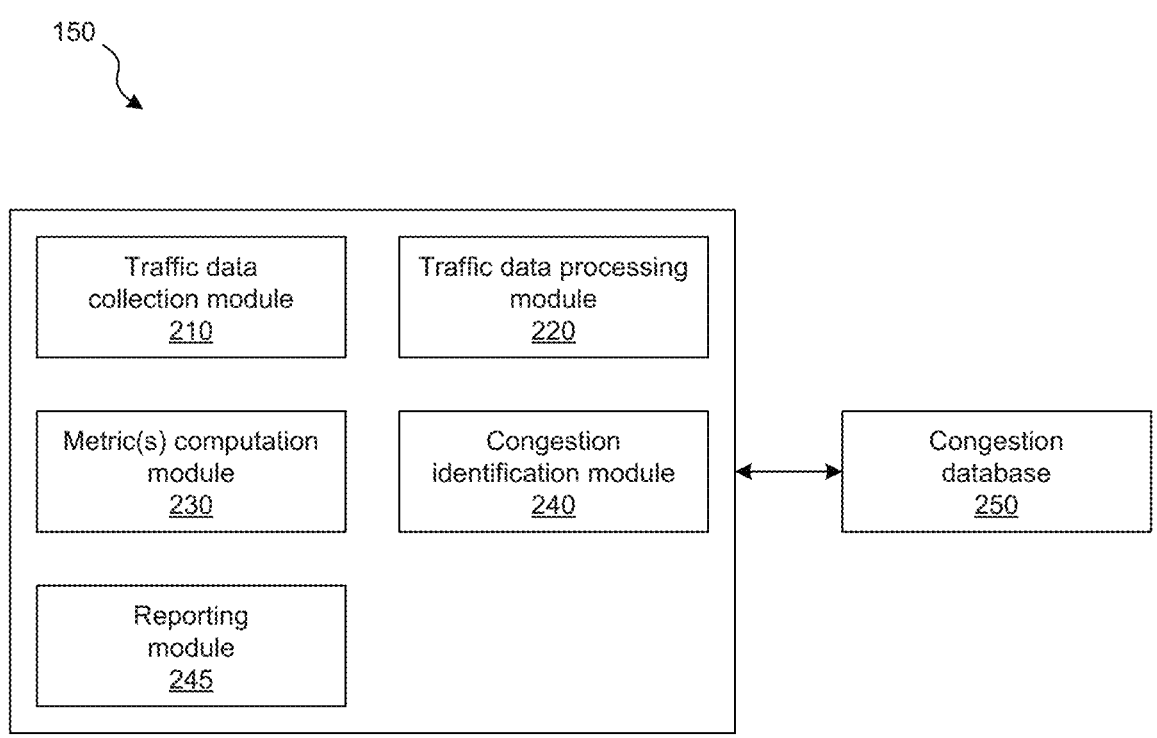
FIG. 2 is a block diagram illustrating the components of the congestion management system.

FIG. 2 is a block diagram illustrating the components of the congestion management system 150. The congestion management system 150 may include functional modules that are implemented with a combination of software (e.g., executable instructions, or computer code) and hardware (e.g., at least a memory and processor). Accordingly, as used herein, in some examples a module is a processor-implemented module or set of code, and represents a computing device having a processor that is at least temporarily configured and/or programmed by executable instructions stored in memory to perform one or more of the particular functions described herein. For example, the congestion management system 150 may include a traffic data collection module 210, a traffic data processing module 220, a metric(s) computation module 230, a congestion identification module 240, and a reporting module 245.

In some embodiments, the traffic data collection module 210 is configured and/or programmed to receive traffic data from one or more sources. For example, traffic data collection module 210 receives call detail records (CDRs) that document the details of a telephone call or other telecommunications transaction (e.g., text message, data session flow, duration, data volume, content class, and so on) that passes through a telecommunications network. CDRs can contains various attributes of the communication, such as communication type (e.g., call, text, content, etc.), time, duration, volume, completion status, source number, and destination number. Traffic data collection module 210 may receive traffic related data that is collected and transmitted by one or more applications (e.g., applications that monitor traffic, network usage, coverage/received signal level etc.) at user devices. For example, a telecommunications service provider may install applications on devices on their network to track and monitor network usage (e.g., call traffic, data traffic, etc.) by the devices. Such applications may regularly, say daily, transmit reports, containing information similar to that in the CDRs, data Usage, to the telecommunications service provider, which may then forward them to the congestion management system 150. Traffic data collection module 210 may receive traffic related data that is collected and transmitted by one or more specific applications downloaded from $3^{rd}$ party, say Netflix, Facebook, Google, and installed at user devices. Through an agreement with the related $3^{rd}$ party, the $3^{rd}$ party may regularly, say daily, forward the collected data to the congestion management system 150. Traffic data collection module 210 may receive traffic related data from an external Data Exchange entity (New Idea)) which shares data collected by any other parties. The external Data Exchange entity may regularly, say daily, forward the collected data to the congestion management system 150. The traffic data collection module 210, in some cases, performs some pre-processing on the traffic data samples to identify certain attributes in the traffic data that may be used for congestion detection and identification. For example, the traffic data collection module 210 identifies location information, timestamp information, and request time information for each traffic data record, if available. In some cases, the traffic data collection module 210 correlates data from multiple sources to identify this information. For example, traditional CDR data sample may not have location information of each event. In this case, the traffic data collection module 210 correlates data collected from devices or cell sites via IMSI/MSISDN to get/identify location information for every event. Sometimes, data sources are complementary.

Figure 5:
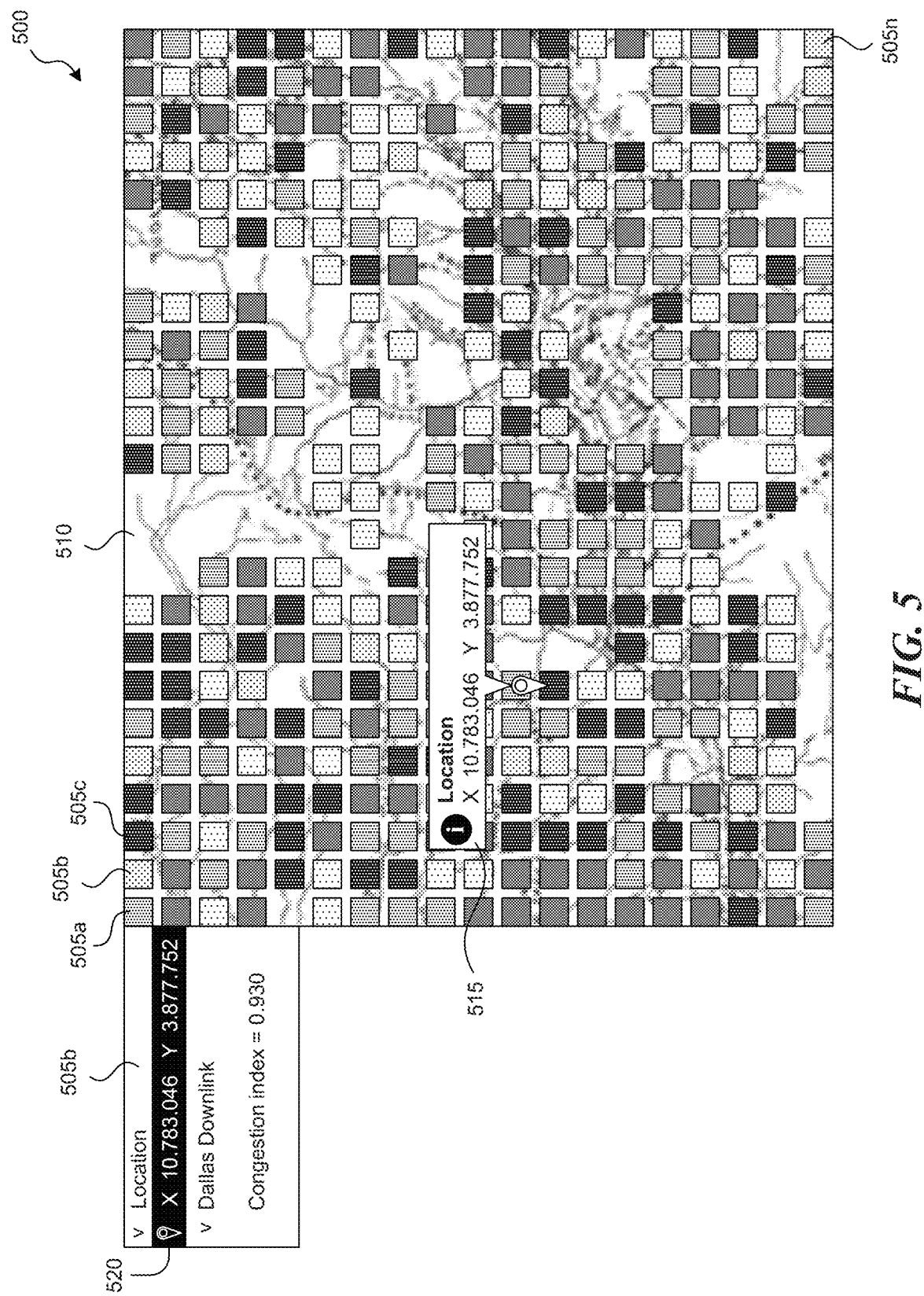
FIG. 5 is a display diagram illustrating an example user interface for viewing congestion indicators in a geographic area.
Figure 6A:
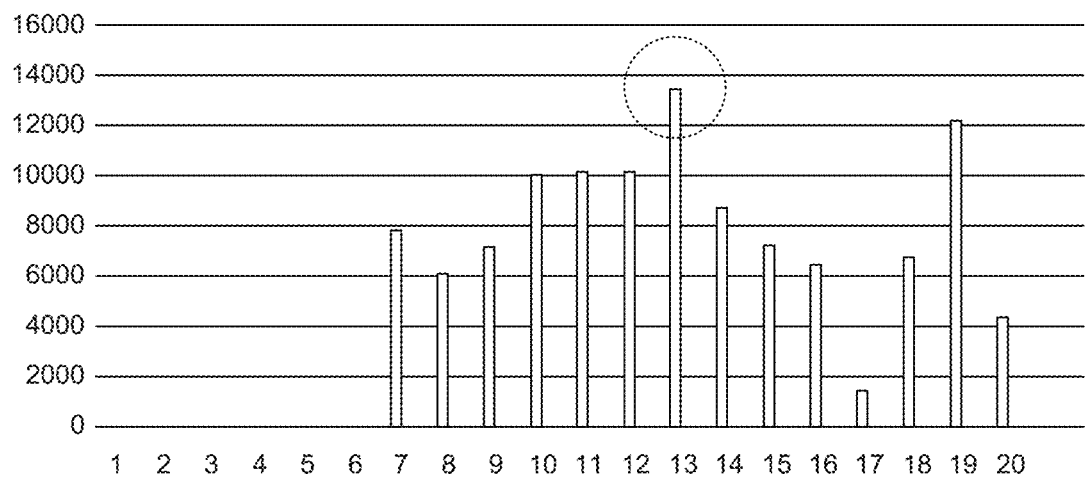
FIGS. 6A-6D are display diagrams illustrating examples of data consumption pattern and traffic data samples.
Figure 6B:
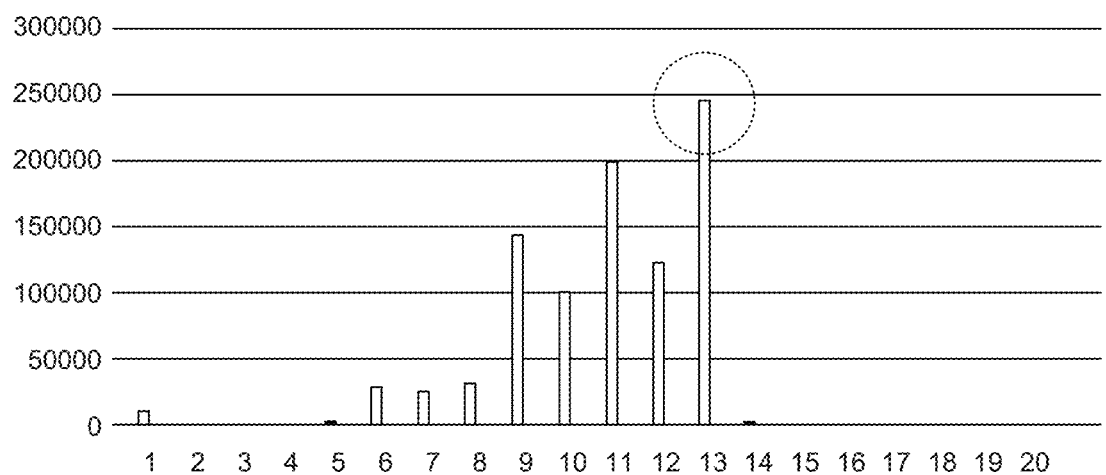
Figure 6C:
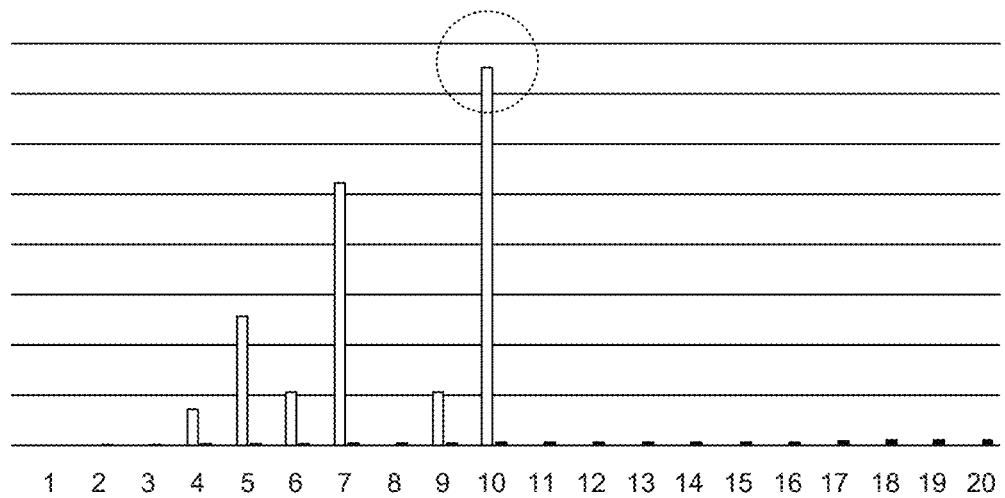
Figure 6D:
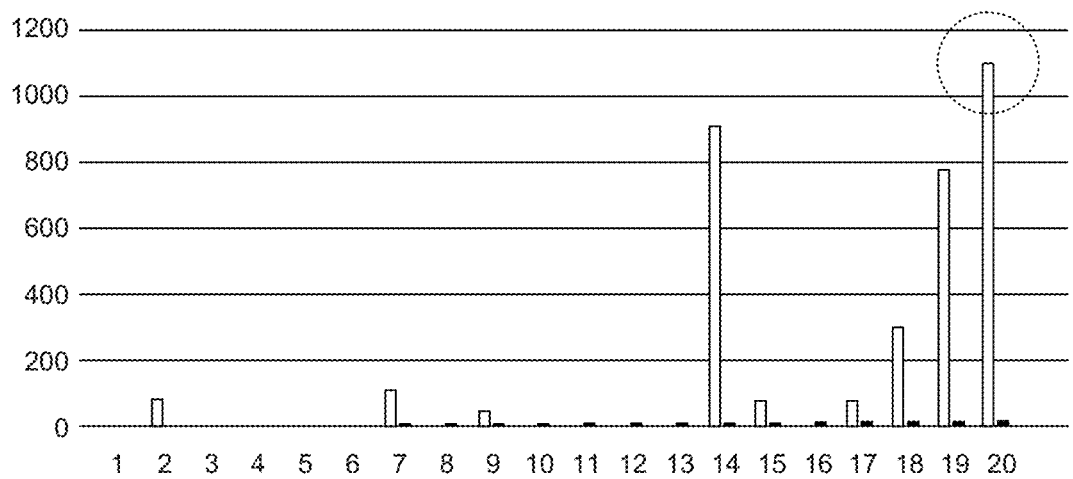

In some embodiments, the traffic data processing module 220 is configured and/or programmed to process the traffic data to prepare it for use by the metric(s) computation module 230. For example, the traffic data processing module 220 sorts and divides the traffic data into geographic-area subsets or tile based on data sample location information. A particular geographic area (e.g., a city) may be divided into subsets (e.g., corresponding to a fixed and/or variable shape (e.g., square, hexagon, rectangle, etc.) and size). For example, as illustrated in FIG. 5, geographic area 510 is divided into geographic subsets that are square in shape and are of a fixed size (e.g., 50×50 meters). The traffic data processing module 220 divides the traffic data samples into geographic-area subsets that correspond to traffic data samples in each particular geographic subset.

Figure 3:
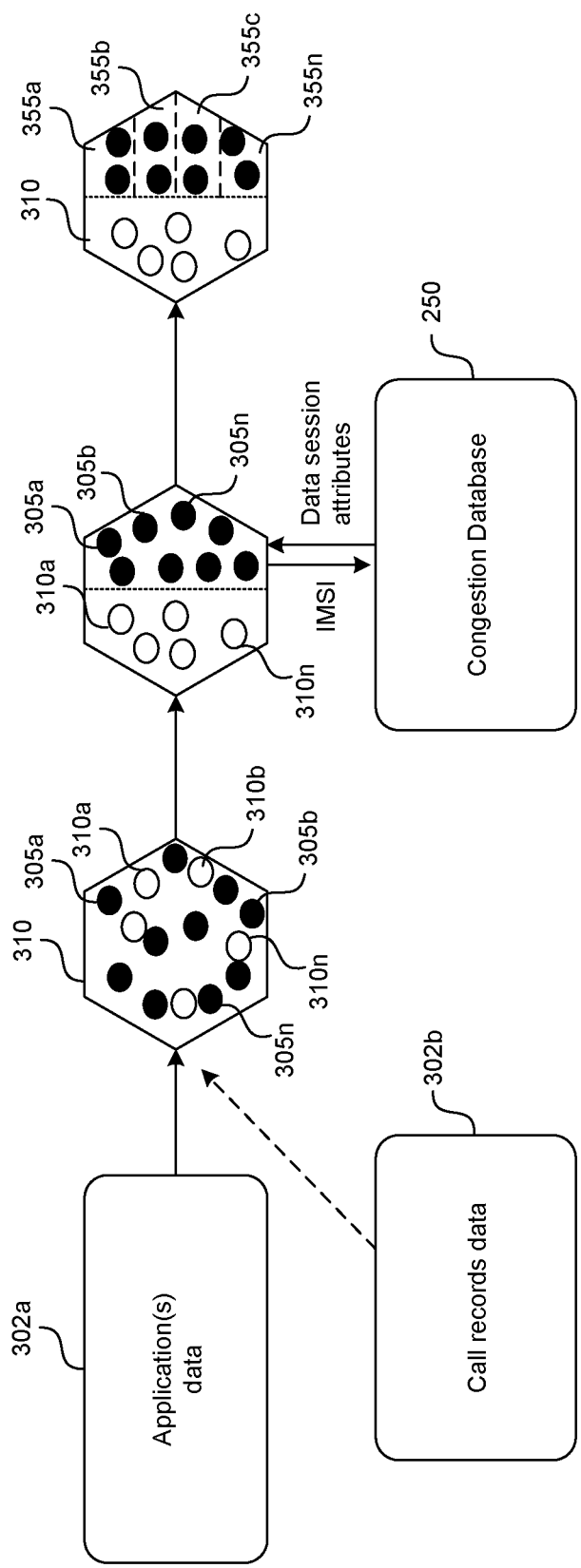
FIG. 3 is a flow diagram illustrating a method of detecting congestion and identifying potential congestion points in a telecommunications network.

The traffic data processing module 220 may further divide the traffic data in each geographic-area subset based on additional congestion discriminating characteristics (e.g., timestamp (e.g., samples can be divided into 1 hour groups), call request (call duration), data request (data session flow, duration, data volume/size), type or class of traffic data sample (e. g, streaming, audio, streaming video, web, email, text), content (e.g. dating, maps, social, gaming, music, web browsing), application protocol (e.g., HTTP, DNS, SIP) etc.) into congestion discriminator characteristic subsets. For example, as illustrated in FIG. 3, the traffic data processing module 220, first divides the traffic data samples (received from, for example, Application(s) data 302*a*, call data records 302*b*, etc.) into geographic-area subsets (e.g., item 310), and then further sub-divides each traffic data sample into time-based subsets (e.g., items 355*a*, 355*b* . . . 355*n*) based on the timestamp associated with each traffic data sample in the geographic-area subset. In some cases, the traffic data processing module 220 accesses the congestion database 250 to correlate with other data sources to seek for incomplete/missing information (e.g., event location, traditional CDRs may not have location tag) associated with the traffic data samples. As illustrated in FIG. 3, the traffic data processing module 220 accesses the data collected from devices or cell sites in the congestion database 250, based on, for example, subscriber identification information (e.g., International Mobile Subscriber Identity (IMSI)) to determine call/data event location information or data session attributes so that the traffic data processing module 220 can first divides the traffic data samples into geographic-area subsets (e.g., item 310), and then further sub-divides each traffic data sample into time-based subsets (e.g., items 355a, 355b . . . 355n) based on the timestamp associated with each traffic data sample in the geographic-area subset.

In some embodiments, the traffic data processing module 220 may be configured to identify qualified data samples from the traffic data samples. The qualified data samples may be identified prior to dividing the traffic data samples into geographic-area subsets and/or congestion discriminator characteristic subsets (e.g., time-based subsets). For example, as illustrated in FIG. 3, the qualified data samples are depicted by solid circles (e.g., 305a, 305b, . . . , 305n) and unqualified data samples are depicted by empty circles (e.g., 310a, 310b, . . . , 310n). The traffic data processing module 220 may filter the qualified data samples from the set of all data sample, as depicted by items 305a, 305b, . . . , 305n (the unqualified data samples are depicted by items 310a, 310b, . . . , 310n). Generally, qualified data samples are those samples which are valid for computing desired metrics or deriving meaningful insights. For example, data sample may have location information (e.g. latitude/longitude/accuracy) with the location accuracy of 2000 meter. In this case, the data sample is considered as unqualified data sample for a geographic subset that is square in shape and is of a fixed size (e.g., 50×50 meters) because the data sample may be located far out of the geographic subset. For another example, as illustrated in FIGS. 6A-6D, the traffic data processing module 220 identifies the data samples in charts depicted in FIGS. 6A and 6B as qualified data samples because they represent the maximum network download data size which the device could achieve at that moment within a duration of 100 ms. On the other hand, the traffic data processing module 220 identifies the circled data samples in charts depicted in FIGS. 6C and 6D as unqualified data samples because they don't represent the maximum network download data size which the device could achieve at that moment within a duration of 100 ms. Various techniques may be utilized to identify the qualified data samples.

In some embodiments, the metric(s) computation module 230 is configured and/or programmed to evaluate the traffic data samples in each congestion discriminator characteristic subset to compute metric value(s). The metric(s) computation module 230 computes one or more metric values, such as average data rate, average data size, average session time, average call volume, etc. The metric(s) computation module 230 may access the congestion database 250 to identify which metric values to compute, and/or to identify one or more parameter values associated with each metric. For example, the metric(s) computation module 230 computes the following metric values for the ith congestion discriminator characteristic subset with M qualified data samples:

$$\text{Average Data Rate, } A(i) = \frac{1}{M}\sum_{j=1}^{M}\frac{V_j(i)}{T_j(i)}$$

$$\text{Average Data Size, } V(i) = \frac{1}{M}\sum_{j=1}^{M}V_j(i)$$

$$\text{Average Session Time, } \overline{T}(i) = \frac{1}{M}\sum_{j=1}^{M}T_j(i)$$

where M=Total number of traffic data samples in the ith congestion discriminator characteristic subset
$V_j(i)$=data size of traffic sample i
$T_j(i)$=session duration of traffic sample i As another example, the metric(s) computation module 230 computes following metric values for the ith congestion discriminator characteristic subset with the fixed sampling duration of T, say T=100 ms:

$$\text{Average Data Rate, } A(i) = \frac{1}{NT}\sum_{j=1}^{N}S_j(i)$$

$S_j$ is qualified samples.

$T = 100$ ms where N=total number of traffic data samples in the ith congestion discriminator characteristic subset The metric(s) computation module 230 may similarly compute the average data size and average session time.

The metric(s) computation module 230 further computes the largest metric value across all congestion discriminator characteristic subsets (e.g., all time-based subsets) based on the metric values for each congestion discriminator characteristic subset. For example, the computation module 230 computes the largest metric value $A_{max}$ across all congestion discriminator characteristic subsets as follows:

$$A_{max} = \max_{M}(A(i)), i = 1, 2, \ldots, M$$

The maximum value is achieved at i=k, that is, at the kth congestion discriminator characteristic subsets In some embodiments, the congestion identification module 240 is configured and/or programmed to compute a congestion index for each geographic-based subset. For example, the congestion identification module 240 computes a congestion index, C, for a given geographic-based subset with M non-zero data session time frames as follows:

$$C = 1 - \frac{1}{(M-1)A_{max}}\sum_{\substack{i=1 \\ i \neq k}}^{M}A(i)$$

The value of the congestion index, C, is between 0 and 1 (i.e., 0≤C≤1).

Figure 7:
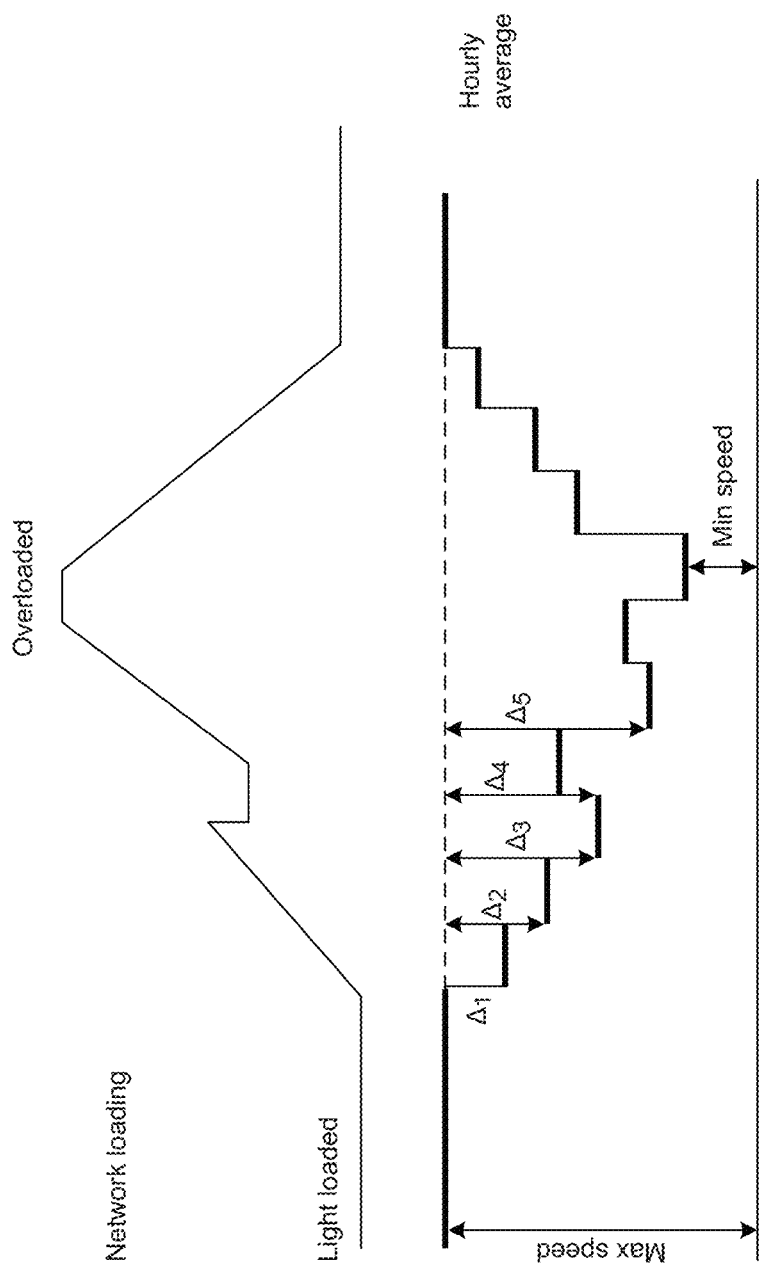
FIG. 7 is a display diagram illustrating a chart summarizing congestion in a telecommunications network The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

In some embodiments, the congestion identification module 240 computes a weighted value of the congestion index for each geographic-area subset. For example, the congestion identification module 240 computes the congestion index by applying a weight based on the number of traffic data samples in a congestion discriminator characteristic subset (or time-based subset) over the total number of data samples across all congestion discriminator characteristic subsets (or time-based subsets). The congestion identification module 240 may, for the computed metric or average data rate in a time-based subset, compute delta values that capture the difference between the maximum rate in all time-based subsets and the average data rate of each time-based subset. For example, as illustrated in FIG. 7, the congestion identification module 240 computes delta values (delta 1, delta 2, delta 3, . . . , delta n) for each average data rate in the time-based subset as the difference between the maximum rate in all the time-based subsets and the data rate of each time-based subset. The congestion identification module 240 then computes a congestion per time-based subset value for each time-based subset as follows:

$$C \text{ per time-based subet} = \frac{\Delta * (\text{number of samples in the time-based subset})}{\text{total number of samples in all time-based subsets}}$$

The congestion identification module 240 then computes a congestion index value for the geographic-area subset as the average of all congestion per time-based subset values, for each time-based subset in the geographic-area subset.

Based on the value of the congestion index, the congestion identification module 240 can detect whether the particular geographic-area subset is congested. For example, if the value of the congestion index, C, for a geographic-area subset is equal to zero (0) (i.e., C=0), then there is no congestion in the geographic-area subset. On the other hand, if the value of the congestion index, C, for a geographic-area subset is equal to one (1) (i.e., C=1), then the geographic-area subset is totally congested. Values between zero and one can indicate varying degrees of congestion. For example, as illustrated in FIG. 5, different geographic-area subsets (e.g., 505a, 505b, 505c, . . . , 505n), in a geographic area 510, can have different congestion index values (illustrated by different grading, with a darker grading indicating higher congestion index value and a lighter grading indicating a lower congestion index value). The congestion identification module 240 identifies geographic-area subsets with a congestion index value above a certain threshold value as potential congestion points. The threshold value can be predetermined (e.g., stored in the congestion database 250, stored in a parameters/settings file, etc.) or can be determined dynamically based on network parameters (e.g., time of day, frequency of congestion alerts, etc.).

In some embodiments, the reporting module 245 is configured and/or programmed to generate predetermined/ad hoc reports regarding the metric value(s), congestion index values, potential congestion points, etc. The reporting module 245 may access information for generating reports directly from one or more modules described above, and/or from the congestion database 250.

Figure 4:
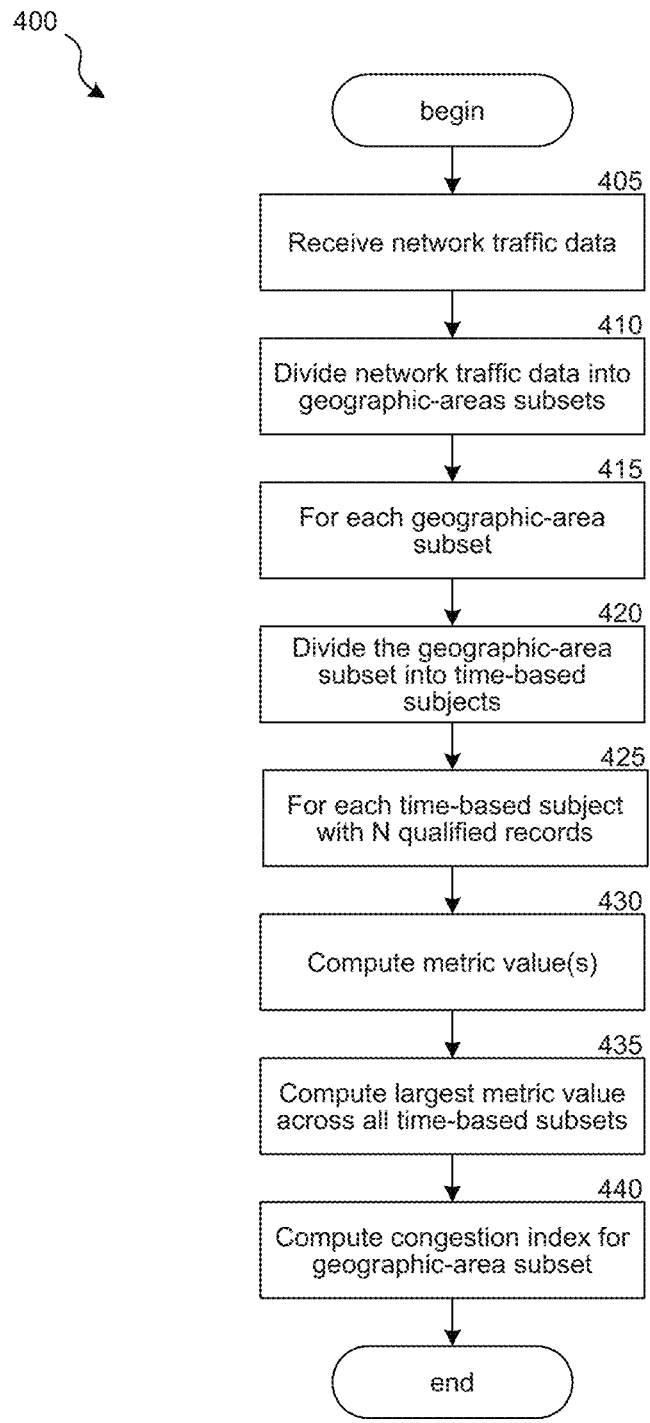
FIG. 4 is a flow diagram illustrating a method of detecting congestion and identifying potential congestion points in a telecommunications network.

FIG. 4 is a flow diagram illustrating a process 400 of detecting congestion and identifying potential congestion points in a telecommunications network. Process 400 begins at step 405, where a congestion management system 150 receives and processes traffic data from one or more sources, such as, call detail records (CDRs), traffic related data collected and transmitted by one or more applications (e.g., applications that monitor traffic, network usage, etc.) at user devices, etc. (may include $3^{rd}$ Party data or Data Exchange entity). Traffic data may be processed to identify certain attributes that may be used for congestion detection and identification. For example, the congestion management system 150 identifies location information, timestamp information, and request location and time information for each traffic data record, if available. In some cases, the congestion management system 150 correlates data from multiple sources to identify this information. At step 410, the congestion management system 150 sorts and divides the traffic data into geographic-area subsets. Traffic data for a particular geographic area (e.g., a city) may be divided into subsets (e.g., corresponding to a fixed and/or variable shape (e.g., square, hexagon, rectangle, etc.) and size). For example, as illustrated in FIG. 5, geographic area 510 is divided into bounded areas that are square in shape and are of a fixed size (e.g., 50×50 meters) (e.g., squares 505a, 505b, 505c, . . . , 505n). Each geographic-area subset comprises traffic data samples that correspond to each bounded area (e.g., each square 505a, 505b, 505c, . . . , 505n in FIG. 5).

Starting at step 415, process 400 performs the following steps for each geographic-area subset. At step 420, each geographic-area subset is divided into congestion discriminator characteristic subsets based on additional congestion discriminating characteristics (e.g., timestamp (e.g., samples can be divided into 1 hour groups), call request (call duration), data request (data session flow, duration, data volume/size), type or class of traffic data sample (e. g, streaming, audio, streaming video, web, email, text), content (e.g. dating, maps, social, gaming, music, web browsing), application protocol (e.g., HTTP, DNS, SIP) etc.). For example, each geographic-area subset is divided into time-based subsets, each of which comprises traffic data samples associated with a timestamp in a particular time range. As an example, the time-based subsets could each correspond to the hours in a day: time-based subset$_1$=<traffic data samples with timestamps from 9 am-10 am>, time-based subset$_2$=<traffic data samples with timestamps from 10 am-11 am>, etc. Other examples include dividing the traffic data samples based on a range of hours (e.g., morning, afternoon, evening, etc.), day of the week (Monday, Tuesday, etc.), or other characteristics.

At step 425, process 400 filters the traffic data samples in each congestion discriminator characteristic subset to identify qualified data samples. Various techniques may be utilized to identify the qualified data samples. For example, as illustrated in FIG. 6, the traffic data processing module 220 identifies the data samples in charts depicted in FIGS. 6A and 6B as qualified data samples. Once the qualified data samples are identified, at step 430, process 400 computes metric value(s) for each congestion discriminator characteristic subset with a threshold number of qualified samples. The threshold number of qualified samples signifies the minimum number of samples that should be present in each congestion discriminator characteristic subset for that congestion discriminator characteristic subset to be used for congestion identification. The threshold number of qualified samples may be pre-determined (e.g., based on a setting/parameter value) or may be determined dynamically (e.g., based on network conditions, time of day, etc.). Examples of metric values include, but are not limited to, average data rate, average data size, average session time, average call volume, etc. At step 435, process 400 identifies the largest metric value, for each metric type, across all congestion discriminator characteristic subsets (e.g., time-based subsets). Using the largest metric value, at step 440, process 400 computes a congestion index value, as discussed in detail above, for each geographic-based subset. Based on the value of the congestion index, process 400 can detect whether the particular geographic-area subset is congested. For example, if the value of the congestion index, C, for a geographic-area subset is equal to zero (0) (i.e., C=0), then there is no congestion in the geographic-area subset. On the other hand, if the value of the congestion index, C, for a geographic-area subset is equal to one (1) (i.e., C=1), then the geographic-area subset is totally congested. Values between zero and one can indicate varying degrees of congestion.

FIG. 5 is a display diagram illustrating an example user interface 500 for viewing congestion indicators in a geographic area. As illustrated in FIG. 5, a user may view a map 510 of geographic area. The map 510 may be divided into geographic-area subsets 505a, 505b, 505c, . . . , 505n, each of which correspond to a specific shaped and sized tile (e.g., 50×50 m squares). Each geographic-area subset 505a, 505b, 505c, . . . , 505n can be visually graded to indicate its congestion index value (e.g., darker grading indicating higher congestion index value and a lighter grading indicating a lower congestion index value). A user may select a geographic-area subset (e.g., by clicking, dragging and dropping a location marker, etc.). When a user selects a geographic-area subset, a control displaying the subset's location coordinates (control 515) may be displayed. In some embodiments, the user may view the congestion index value of a selected geographic-area subset in control 520. For example, control 520 displays the congestion index value (0.930—likely highly congested) for the selected geographic-area subset (associated with control 515) having unique latitude and longitude coordinates.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively or additionally, network elements performing those functions could be replaced by two or more elements to perform portions of those functions. In addition, while processes, message/data flows, or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes, message/data flows, or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges. Those skilled in the art will also appreciate that the actual implementation of a database may take a variety of forms, and the term "database" is used herein in the generic sense to refer to any data structure that allows data to be stored and accessed, such as tables, linked lists, arrays, etc.

The teachings of the methods and system provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the technology can be modified, if necessary, to employ the systems, functions, and concepts of the various references described above to provide yet further embodiments of the technology.

These and other changes can be made to the invention in light of the above Detailed Description. While the above description describes certain embodiments of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the technology.

The invention claimed is:

1. A telecommunications network for providing call and data communication services, the network comprising:
   a set of telecommunication nodes servicing mobile devices, wherein each telecommunication node provides telecommunication services in a geographic area; and
   a congestion management server comprising:
      at least one hardware processor; and
      at least one memory, coupled to the at least one hardware processor, and carrying instructions to be executed by the at least one hardware processor, wherein the instructions perform operations:
         to receive at least one set of network traffic data records for a geographic area,
            wherein each network traffic data record in the set of network traffic data records is associated with a location indicator indicating a location of an event that generated the network traffic data record;
         to divide the geographic area into geographic-area subsets, wherein each geographic-area subset is of a same particular shape or a same particular size;
         to divide the at least one set of network traffic data records into one or more geographic-area traffic records subsets, wherein each geographic-area traffic records subset comprises network traffic data records corresponding to each geographic-area subset based on the location indicators associated with each network traffic data record in the set of network traffic data records; and
         for each geographic-area traffic records subset corresponding to traffic records of a geographic subset:
            to divide the geographic-area traffic records subset into one or more time-based traffic records subsets based on timestamp indicators associated with each geographic-area traffic record in the geographic area traffic records subset;
            to compute a metric value for qualified time-based records in each time-based traffic records subset;
            to compute a largest metric value across all time-based traffic records subsets based on the metric values for each time-based traffic records subset;
            to compute a congestion index for the geographic-area subset based on the metric values for each time-based traffic records subset and the largest metric value across all time-based traffic records subsets,
               wherein the geographic-area subset is capable of being visually graded on a congestion map to indicate its congestion index; and
            when the congestion index for the geographic-area subset is greater than a congestion threshold amount, to:
               identify the geographic-area subset as a potential congestion point;
               identify at least one telecommunication node from the set of telecommunication nodes, wherein the identified at least one telecommunication node provides telecommunication services in the geographic area associated with the identified potential congestion point geographic-area subset; and
               transmit at least one congestion remediation message to the identified at least one telecommunication node.

2. The telecommunications network of claim 1, wherein the at least one congestion remediation message comprises instructions to increase bandwidth of the identified at least one telecommunication node, increase sectors of the identified at least one telecommunication node, increase amount per spectrum of the identified at least one telecommunication node, add a new frequency band, or any combination thereof.

3. The telecommunications network of claim 1, wherein the metric value is one of: average data rate, average data size, or average session time.

4. The telecommunications network of claim 1, wherein the location indicator is: latitude coordinates, longitude coordinates, elevation coordinates, address, postal code, street, town, city, state, landmark, or any combination thereof.

5. The telecommunications network of claim 1, wherein each time-based traffic records subset corresponds to a timeframe, and wherein the timeframe has a begin time and an end time, and wherein the difference between the begin time and the end time is a function of number of seconds, number of minutes, number of hours, number of days, time of day, or any combination thereof.

6. The telecommunications network of claim 5, wherein each time-based traffic records subset corresponds to a timeframe.

7. A method for detecting and identifying points of congestion in a telecommunications network, the method comprising:
   receiving, at a congestion management server, at least one set of network traffic data,
      wherein each record in the at least one set of network traffic data is associated with a geographic location indicator that identifies a location of a network entity in a geographic area when the network entity generated the record;
   dividing the at least one set of network traffic data into one or more geographic-area subsets based on the geographic location indicators associated with each record in the at least one set of network traffic data, wherein each geographic-area subset is of a same particular shape or a same particular size; and
   for each geographic-area subset:
      dividing the geographic-area subset into one or more time-based subsets based on timestamp indicators associated with each geographic-area record in the geographic-area subset;
      computing a metric value for each time-based subset that has a threshold number of qualified time-based records valid for computing one or more metric values,
         wherein the threshold number of qualified time-based records is a minimum number of time-based records that are to be present in a time-based subset for that time-based subset to be used for congestion identification;
      determining a largest metric value across all time-based subsets based on the metric values for each time-based subset;
      computing a congestion index for the geographic-area subset based on the metric values for each time-based subset and the largest metric value across all time-based subsets, wherein the geographic-area subset is capable of being visually graded on a congestion map to indicate its congestion index; and when the congestion index for the geographic-area subset is greater than a congestion threshold amount;
identifying the geographic-area subset as a potential congestion point;
identifying at least one telecommunication node from a set of telecommunication nodes, wherein the identified at least one telecommunication node provides telecommunication services in the geographic area associated with the identified potential congestion point geographic-area subset; and
transmitting at least one congestion remediation message to the identified at least one telecommunication node.

8. The method of claim 7, wherein the metric value is one of: average data rate, average data size, or average session time.

9. The method of claim 7, wherein the location indicator is: latitude coordinates, longitude coordinates, elevation coordinates, address, postal code, street, town, city, state, landmark, or any combination thereof.

10. The method of claim 7, wherein each geographic-area subset corresponds to a geographic area.

11. The method of claim 7, wherein the threshold number of qualified time-based records is determined dynamically based on: condition of the telecommunications network, time of day, or both.

12. The method of claim 11, wherein each time-based subset corresponds to a timeframe and wherein the timeframe has a begin time and an end time, and wherein the difference between the begin time and the end time is a function of number of seconds, number of minutes, number of hours, number of days, time of day, or any combination thereof.

13. The method of claim 7, wherein the at least one set of network traffic data comprises data call records, data speed records gathered using one or more applications at a mobile device, information provided by a third party, information provided by external data exchange entity sources, or any combination thereof.

14. The method of claim 7, further comprising transmitting a message to deploy one or more small cell sites at a location associated with geographic-area subsets identified as potential congestion points.

15. At least one non-transitory computer-readable memory carrying instructions to be executed by at least one processor, wherein the instructions are to perform a method to detect and identify points of congestion in a telecommunications network, the method comprising:

dividing at least one set of network traffic data records for a geographic area into one or more geographic-area traffic records subsets,
wherein each geographic-area traffic records subset comprises network traffic data records corresponding to a geographic-area subset of the geographic area based on location indicators associated with each network traffic data record in the at least one set of network traffic data records,
wherein each geographic-area subset is of a same particular shape or a same particular size; and for each geographic-area traffic records subset corresponding to traffic records of a geographic area subset:
dividing the geographic-area traffic records subset into one or more congestion characteristics-based traffic records subsets based on one or more of the following: timestamp indicators associated with each geographic-area traffic record in the geographic-area traffic records subset, type or class of each geographic-area traffic record in the geographic-area traffic records subset, type of content associated with each geographic-area traffic record in the geographic-area traffic records subset, or type of application protocol associated with each geographic-area traffic record in the geographic-area traffic records subset;
computing a metric value for qualified congestion characteristics-based records in each congestion characteristics-based traffic records subset;
computing a congestion index for the geographic subset, wherein the congestion index is a function of the metric values for each congestion characteristics-based traffic records subset,
wherein the geographic-area subset is capable of being visually graded on a congestion map to indicate its congestion index; and
when the congestion index for the geographic subset is greater than a congestion threshold amount;
identifying the geographic-area subset as a potential congestion point;
identifying at least one telecommunication node from a set of telecommunication nodes, wherein the identified at least one telecommunication node provides telecommunication services in the geographic area associated with the identified potential congestion point geographic-area subset; and
transmitting at least one congestion remediation message to the identified at least one telecommunication node.

16. The at least one non-transitory computer-readable memory of claim 15, wherein the at least one set of network traffic data comprises data call records, data speed records gathered using one or more applications at a mobile device, information provided by a third party, information provided by external data exchange entity sources, or any combination thereof.

17. The at least one non-transitory computer-readable memory of claim 15, wherein the metric value is one of: average data rate, average data size, or average session time.

18. The at least one non-transitory computer-readable memory of claim 15, wherein the location indicator is: latitude coordinates, longitude coordinates, elevation coordinates, address, postal code, street, town, city, state, landmark, or any combination thereof.

19. The at least one non-transitory computer-readable memory of claim 15, wherein each time-based traffic records subset corresponds to a timeframe, wherein the timeframe has a begin time and an end time, and wherein the difference between the begin time and the end time is a function of number of seconds, number of minutes, number of hours, number of days, time of day, or any combination thereof.

* * * * *